(12) United States Patent
Bauck

(10) Patent No.: US 10,376,911 B2
(45) Date of Patent: Aug. 13, 2019

(54) HANDHELD FLUID METER

(71) Applicant: Graco Minnesota Inc., Minneapolis, MN (US)

(72) Inventor: Mark L. Bauck, Coon Rapids, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/863,293

(22) Filed: Jan. 5, 2018

(65) Prior Publication Data

US 2018/0185868 A1 Jul. 5, 2018

Related U.S. Application Data

(60) Provisional application No. 62/442,738, filed on Jan. 5, 2017.

(51) Int. Cl.
| | | |
|---|---|---|
| *B05B 12/00* | (2018.01) | |
| *B05B 9/04* | (2006.01) | |
| *G01F 1/05* | (2006.01) | |
| *G01F 13/00* | (2006.01) | |
| *B67D 7/22* | (2010.01) | |
| *B67D 7/04* | (2010.01) | |
| *G01F 15/06* | (2006.01) | |
| *B67C 11/02* | (2006.01) | |

(52) U.S. Cl.
CPC ............. *B05B 12/008* (2013.01); *B05B 9/04* (2013.01); *B67D 7/04* (2013.01); *B67D 7/22* (2013.01); *G01F 1/05* (2013.01); *G01F 13/00* (2013.01); *B67C 2011/027* (2013.01); *G01F 13/006* (2013.01); *G01F 15/061* (2013.01)

(58) Field of Classification Search
CPC . B05B 12/008; B05B 9/04; G01F 1/05; G01F 13/00; G01F 13/006; B67D 7/22; B67D 7/04; B67C 2011/027
USPC ..... 222/71, 72, 460; 73/861.79, 861.52, 207, 73/861.87, 861.82–861.84
See application file for complete search history.

(56) References Cited

U.S. PATENT DOCUMENTS

| 42,684 A | * | 5/1864 | Otis | ............................. 222/460 |
| 5,913,180 A | * | 6/1999 | Ryan | .................... B67D 7/145 235/375 |
| 6,238,721 B1 | | 5/2001 | Knepler | |

(Continued)

FOREIGN PATENT DOCUMENTS

| CN | 1757590 A | 4/2006 |
| CN | 101246035 A | 8/2008 |

OTHER PUBLICATIONS

First Chinese Office Action for CN Application No. 201810013159. 5, dated Jun. 13, 2019, pp. 20.

*Primary Examiner* — Lien M Ngo
(74) *Attorney, Agent, or Firm* — Kinney & Lange, P.A.

(57) ABSTRACT

A wireless metered fluid dispenser brings discrete fluid dispense events inside of a fluid management system. The wireless metered fluid dispenser allows a customer to visually confirm the fluid being dispensed and provides automatic tracking of the fluid dispense event within a wireless tracking system. A volumetric flowmeter attached to the bottom of a container or funnel tracks the amount of fluid dispensed when pouring from a container. The volumetric meter is wirelessly connected to a computer system for the transmission of data, for the purpose of centralized control and billing.

20 Claims, 7 Drawing Sheets

(56) References Cited

U.S. PATENT DOCUMENTS

| | | | |
|---|---|---|---|
| 6,659,306 B2* | 12/2003 | Boyle | B67D 7/145 222/1 |
| 6,886,606 B2 | 5/2005 | Few et al. | |
| 7,784,361 B2* | 8/2010 | Wiedmann | G01F 1/40 73/861.52 |
| 8,429,095 B1 | 4/2013 | Ryan | |
| 2003/0051767 A1 | 3/2003 | Coccaro et al. | |
| 2003/0127469 A1* | 7/2003 | Terry | B65D 1/06 222/158 |
| 2007/0125162 A1 | 6/2007 | Ghazi et al. | |
| 2009/0314797 A1* | 12/2009 | Breeser | B67D 7/04 222/14 |
| 2010/0258587 A1 | 10/2010 | Wheeler et al. | |
| 2011/0018056 A1 | 1/2011 | Takeuchi | |
| 2013/0085443 A1* | 4/2013 | Lowery | G05D 7/0635 604/65 |
| 2013/0206279 A1 | 8/2013 | Ryan | |
| 2013/0313291 A1* | 11/2013 | Gascoine | B65D 1/0223 222/460 |
| 2014/0197194 A1 | 7/2014 | Wegelin et al. | |

* cited by examiner

HANDHELD FLUID METER

CROSS-REFERENCE TO RELATED APPLICATION(S)

This application claims the benefit of U.S. Provisional Application No. 62/442,738 filed Jan. 5, 2017, and entitled "METERED FLUID FUNNEL," the disclosure of which is hereby incorporated in its entirety.

BACKGROUND

This disclosure relates generally to fluid meters. More specifically, this disclosure relates to wirelessly connected handheld fluid meters.

Automotive fluids, such as antifreeze and engine oil, are typically dispensed from bulk containers. For example, automotive service stations typically dispense small amounts of engine oil from a large drum using a handheld device. The handheld devices can communicate with a central fluid monitoring computer to track and record the volume of fluid dispensed from the bulk containers. Tracking and recording the volume of fluid dispensed prevents unauthorized dispensing and provides a simple way to track the overall volume dispensed, simplifying record keeping, workflow, and inventory. However, dispensing the fluid from the bulk containers does not allow the customer to visually verify the actual fluid being dispensed. To provide visual verification, a technician can show the customer a sealed container of the fluid from the original manufacturer, and the customer can then watch the fluid being dispensed to the vehicle from that container. Directly pouring the fluid into the vehicle from a sealed container occurs outside of the fluid tracking system, which can lead to inaccuracies in record keeping and work orders. As such, there is a need for a fluid dispenser capable of guiding fluid poured from a sealed container into a vehicle system while communicating data regarding the fluid dispense event.

SUMMARY

According to one aspect of the disclosure, a handheld fluid meter includes a fluid reservoir, a valve attached to the fluid reservoir, and a flowmeter attached to the valve and disposed within the flow of fluid out of the valve. The valve is configured to control a flow of fluid out of the fluid reservoir. The flowmeter is configured to measure a volumetric flow of the fluid through the meter and configured to wirelessly communicate the volumetric flow count.

According to another aspect of the disclosure, a fluid management system includes a fluid management computer having a processor, and a memory encoded with instructions that, when executed by the processor, causes the processor to track and record a characteristic of a fluid being dispensed by one of a plurality of fluid dispensing components. At least one of the plurality of fluid dispensing components is a handheld fluid meter. The handheld fluid meter includes a fluid reservoir, a valve attached to the fluid reservoir, and a flowmeter attached to the valve and disposed within the flow of fluid out of the valve. The valve is configured to control a flow of fluid out of the fluid reservoir. The flowmeter is configured to measure a volumetric flow of the fluid through the flowmeter and to wirelessly communicate the volumetric flow count to the fluid management computer.

According to yet another aspect of the disclosure, a method of tracking discrete fluid dispense events includes generating a work order associated with a discrete fluid dispense event; dispensing the fluid according to the work order through a handheld fluid meter and from a container mounted on the handheld fluid meter; and generating a volumetric flow count of the fluid with the handheld fluid meter and wirelessly communicating the volumetric flow count to a fluid management computer with the handheld fluid meter.

DETAILED DESCRIPTION

Figure 1:
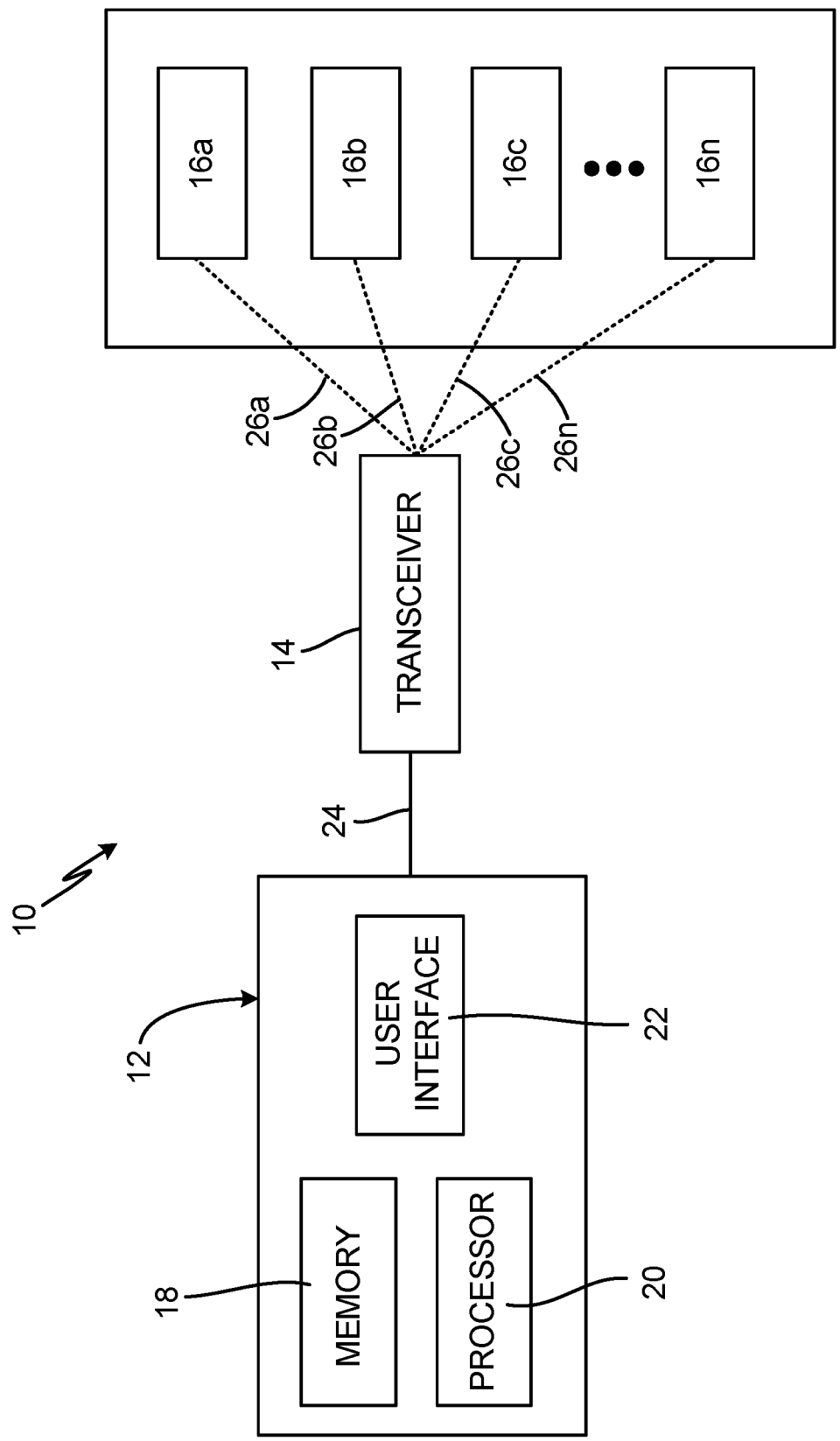
FIG. 1 is a schematic block diagram of a fluid management system.

FIG. 1 is a schematic block diagram of fluid management system 10. Fluid management system 10 includes fluid management computer 12, transceiver 14, and fluid dispensing components 16a-16n (collectively herein "components 16"). Fluid management computer 12 includes memory 18, processor 20, and user interface 22. Fluid management computer 12 communicates with transceiver 14 via communication link 24. Communication link 24 is preferably a wired connection, but can be of any desired configuration, such as wired or wireless. Transceiver 14 communicates with fluid dispensing components 16a-16n via communication links 26a-26n (collectively herein "communication links 26"), respectively. Communication links 26 are preferably wireless connections.

Fluid management system 10 is a system for dispensing fluid and tracking fluid dispenses. For example, fluid management system 10 can be implemented in an automotive shop to track oil, coolant, and other automotive fluids. Fluid dispensing components 16 are various components that monitor, drive, and dispense fluid within the facility. For example, components 16 can include, among others, metering devices, air control units, and tank-level monitors. As described in more detail below, at least one of components 16 can include a handheld fluid meter configured to track discrete fluid dispenses not otherwise trackable within fluid management system 10. Components 16a-16n, including the handheld fluid meter, communicate wirelessly with transceiver 14 via communication links 26a-26n, respectively, such that components 16a-16n can be located at various locations and moved within the facility housing fluid management system 10.

Fluid management computer 12 includes processor 20, memory 18, and user interface 22. Memory 18 stores software that, when executed by processor 20, generates work orders, generates fluid dispense authorizations, tracks and records the volume of each fluid dispersal, and tracks and records fluid inventories, among other options. Fluid management computer 12 can send an identifier, such as a work order number or personal identification number, and other relevant information associated with the identifier, to components 16a-16n via communication link 24, transceiver 14, and communication links 26a-26n. User interface 22 enables a user to interact with fluid management system 10. User interface 22 can be a keyboard, touchscreen, or other suitable interface device.

Processor 20, in one example, is configured to implement functionality and/or process instructions. For instance, processor 20 can be capable of processing instructions stored in memory 18. Examples of processor 20 can include any one or more of a microprocessor, a controller, a digital signal processor (DSP), an application specific integrated circuit (ASIC), a field-programmable gate array (FPGA), or other equivalent discrete or integrated logic circuitry.

Memory 18, in some examples, can be configured to store information during operation. Memory 18, in some examples, is described as computer-readable storage media. In some examples, a computer-readable storage medium can include a non-transitory medium. The term "non-transitory" can indicate that the storage medium is not embodied in a carrier wave or a propagated signal. In some examples, memory 18 is a temporary memory, meaning that a primary purpose of memory 18 is not long-term storage. Memory 18, in some examples, is described as volatile memory, meaning that memory 18 does not maintain stored contents when power to lubricant-level estimator is turned off. Memory 18, in some examples, also includes one or more computer-readable storage media. Memory 18 can be configured to store larger amounts of information than volatile memory. Memory 18 can further be configured for long-term storage of information. In some examples, memory 18 includes non-volatile storage elements.

Components 16 are configured to dispense fluid at and/or drive fluid to a desired dispense location according to information provided by fluid management computer 12. For example, components 16 can be configured to remain in a deactivated, resting state until a dispense authorization is received from fluid management computer 12. The dispense authorization can specify the volume and type of fluid authorized for dispense, and can control components 16 to ensure that the volume and type specified are the actual volume and type dispensed. For example, component 16a can be a metering device for dispensing fluid directly at a location. The metering device is connected to a bulk storage tank and configured to dispense fluid pumped from the bulk storage tank. A trigger of the metering device can remain in a locked position, such that a user cannot depress the trigger, until the proper dispense authorization is received by component 16a from fluid management computer 12. The proper dispense authorization can unlock the trigger, thereby allowing the user to depress the trigger and dispense the fluid. Component 16b can be an air control unit configured to provide pressurization only to the bulk storage tank associated with the work order, and can be configured to provide pressurization for only as long as required to dispense the approved volume of fluid. In this way, component 16a and component 16b work in tandem to ensure that the proper type and volume of fluid is dispensed.

Components 16 can also track the volume of fluid dispensed and provide information regarded each fluid dispense event to fluid management computer 12. For example, component 16a is a metering device and component 16b is an air control unit. Component 16a can include a flowmeter configured to measure the volumetric flow of the fluid pumped through metering device. The volumetric flow can be communicated to fluid management computer 12 to provide the actual volume of fluid dispensed during the fluid dispense event. Component 16b can provide information related to the length of time during which air pressure was provided to the bulk storage tanks, which can be associated with a dispensed volume. Providing information to fluid management computer 12 from components 16a-16n facilitates tracking and recording of information.

Figure 2:
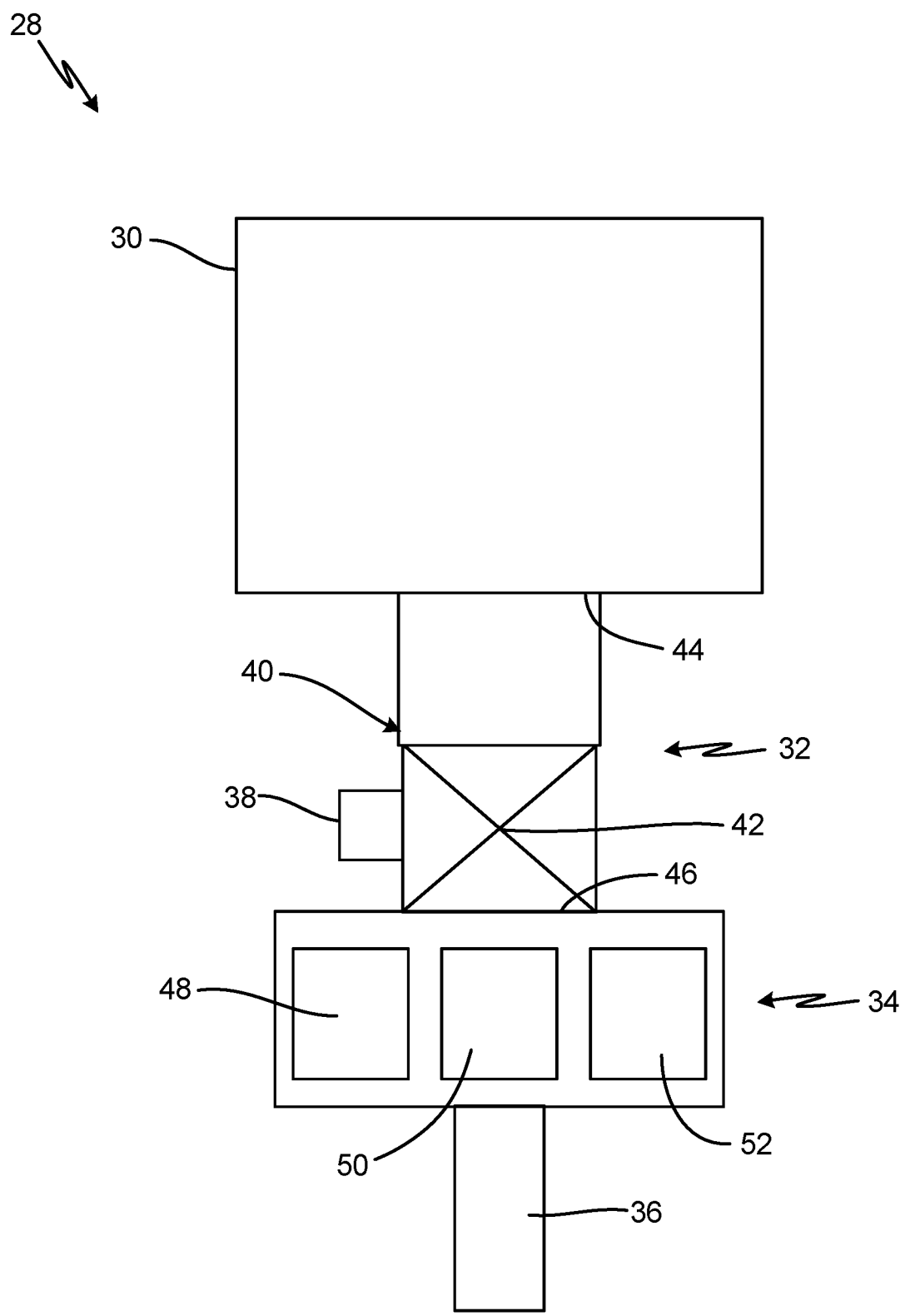
FIG. 2 is a schematic block diagram of a handheld fluid meter.

At least one of components 16 is a handheld fluid meter, such as handheld fluid meter 28 (discussed below and shown in FIGS. 2A-2C). For example, component 16c can be the handheld fluid meter. The handheld fluid meter communicates with fluid management computer 12 regarding discrete fluid dispenses, thereby allowing fluid management system 10 to track discrete dispenses that are outside of fluid management system 10. A discrete fluid dispense event occurs when the fluid is dispensed from a container that is outside of fluid management system. A dispense being referred to as being "outside of" fluid management system means that fluid can typically be dispensed without data regarding the dispersal being communicated to or from fluid management computer 12 before, during, or after the dispersal. For example, a customer can request visual verification of the fluid, such that the customer sees the fluid being applied from a sealed container from the original manufacturer. The service technician can take a sealed container of engine oil and pour the container into an automobile engine using a funnel. However, neither the container nor the funnel communicates with fluid management computer 12, so such a dispersal occurs "outside of" fluid management system 10. The handheld fluid meter brings discrete dispense events inside fluid management system 10.

Where component 16c is the handheld fluid meter, the handheld fluid meter communicates wirelessly via communication link 26c. When a discrete fluid dispense event is requested at fluid management computer 12, such as where the customer requests visual verification of the fluid or where an uncommon fluid is dispensed, the handheld fluid meter allows fluid management system 10 to track and record that discrete dispense event. In some examples, a work order is generated at fluid management computer 12. The user can receive the work order at component 16c, the handheld fluid meter, via communication link 26c. The user dispenses the desired fluid through the handheld fluid meter, such as by pouring the fluid through handheld fluid meter from a manufacturer's container. The handheld fluid meter tracks a volumetric fluid flow and wirelessly provides the volumetric flow data to fluid management computer 12 via communication link 26c, transceiver 14, and communication link 24. As such, the actual volumetric flow data is communicated to, tracked, and recorded by fluid management computer 12. The handheld fluid meter thus brings discrete fluid dispenses inside fluid management system 10.

At least one of components 16a-16n being a handheld fluid meter provides significant advantages. The handheld fluid meter brings discrete fluid dispense events "inside" fluid management system 10, such that such dispenses can be automatically tracked and recorded. Automatic tracking and recording provides increased record-keeping accuracy, increased efficiency, and decreased losses. In addition, handheld fluid meter communicating wirelessly with fluid management computer 12 allows for discrete dispense events to be tracked at any desired location throughout the facility.

FIG. 2A is a schematic block diagram of handheld fluid meter 28. Handheld fluid meter 28 includes fluid reservoir 30, valve 32, flowmeter 34, and nozzle 36. Valve 32 includes trigger 38, valve body 40, and valve member 42. Valve body 40 includes first end 44 and second end 46. Flowmeter 34 includes communication module 48, meter 50, and user interface 52.

Fluid reservoir 30 is mounted on first end 44 of valve body 40, upstream of valve member 42. In some examples, fluid reservoir 30 is removably attached to valve 32, such as by press fitting or a threaded connection. Fluid reservoir 30 can be any suitable vessel for temporarily storing and/or routing the fluid into valve 32 and flowmeter 34. For example, fluid reservoir 30 can be a funnel through which the fluid is poured from another container. In other examples, fluid reservoir 30 can be the manufacturer's original container, which can be opened and attached directly to valve body 40, such as by internal threading configured to mate with external threading on the neck of the manufacturers container. It is understood, however, that fluid reservoir 30 can be any desired container that can be attached to valve body 40 while being properly dimensioned such that handheld fluid meter 28 can be handheld.

Valve 32 controls the flow of fluid out of fluid reservoir 30. Valve body 40 defines a passage through which all fluid exiting fluid reservoir 30 flows. Valve member 42 is disposed in valve body 40 between first end 44 and second end 46 downstream of fluid reservoir 30. Valve member 42 is movable between an open position, where the fluid can flow out of fluid reservoir 30 through valve member 42, and a closed position, where the fluid is prevented from flowing out of fluid reservoir 30. The fluid flows through valve body 40 between fluid reservoir 30 and flowmeter 34. Trigger 38 is mounted on valve body 40 and is configured to shift valve member 42 between the open position and the closed position. Trigger 38 can be manually actuated by the user to control valve member 42 between the open position and the closed position. For example, the user can depress trigger 38 to shift valve member 42 to the open position. In some examples, valve body 40 includes a handle that allows the user to grasp, manipulate, and operate handheld fluid meter 28 with a single hand.

Flowmeter 34 is attached to second end 46 of valve body 40 downstream of valve member 42. Flowmeter 34 is configured to receive the fluid exiting valve 32. Meter 50 is receives the fluid flowing through flowmeter 34 and measures a volumetric flow. Flowmeter 34 transmits the volumetric flow data to the flow management computer. For example, meter 50 can be a positive displacement meter. User interface 52 allows the user to directly communicate with fluid management computer 12 via handheld fluid meter 28. User interface 52 can be of any suitable configuration for allowing the user to receive and provide information, such as a keyboard, touchscreen, or other suitable interface device. Communication module 48 communicates with user interface 52 and with meter 50. Communication module 48 is configured to send information to and receive information from fluid management computer 12 (shown in FIG. 1). While communication module 48 is described as a transceiver capable of both sending and receiving information, it is understood that in some examples communication module 48 is a transmitter configured to operate in a transmit-only state, where communication module 48 is configured to send, but not receive, information. For example, in the transmit-only state the user can input a work order to handheld fluid meter 28 via user interface 52, and handheld fluid meter 28 can send the volumetric flow data associated with the work order to a fluid management computer 12, such as fluid management computer 12 (FIG. 1). While flowmeter 34 is described as including user interface 52 and communication module 48, it is understood that meter 50, communication module 48, and user interface 52 can be a single unit within a shared housing or can be separate units configured to communicate with each other. Nozzle 36 is attached to flowmeter 34 and is configured to guide the fluid exiting flowmeter 34 to the desired dispense location. For example, nozzle 36 can be a flexible tube or a small pipe.

Handheld fluid meter 28 allows discrete fluid dispense events to be tracked and recorded within a fluid management system, such as fluid management system 10 (FIG. 1). Handheld fluid meter 28 also allows the user to visually verify the specific fluid being dispensed with the consumer, while automatically tracking and recording the dispense event. For example, a customer may request that a certain brand/type of fluid, such as engine oil, is provided. The customer may want to visually verify that the oil being provided is actually the brand/type that the customer requested. Visual verification is not possible where the fluid is dispensed from a bulk container. Instead, the technician can show the customer a sealed container of the particular brand/type of fluid requested, and the technician will then dispense the fluid from that container, as requested by the customer. Handheld fluid meter 28 allows for such dispenses to be brought "inside" of the fluid management system.

The user can enter relevant information regarding the discrete dispense event to handheld fluid meter 28 via user interface 52. For example, the user can enter a customer ID, a work order number, and the brand and type of fluid being dispensed, among others. The user can also retrieve the relevant information regarding the discrete dispense event from the fluid management system via communication module 48, and that information can be displayed to the user via user interface 52. For example, all relevant information can be input at a fluid management computer 12 located remotely from handheld fluid meter 28. The user can retrieve the relevant information by merely inputting a unique identifier, such as the work order number, into handheld fluid meter 28 via user interface 52. Handheld fluid meter 28 can then recall all relevant information associated with that work order from the fluid management computer 12.

The user can pour the fluid into fluid reservoir 30 or attach a prefilled fluid reservoir 30 to first end 44 of valve body 40. For example, the user can insert the neck of a funnel into first end 44 or can cause threading on fluid reservoir 30 to engage with threading on first end 44. The user depresses trigger 38, thereby causing valve member 42 to shift to the open position. With valve member 42 in the open position the fluid flows out of fluid reservoir 30, into valve body 40 through first end 44, through valve member 42, through second end 46, and to flowmeter 34. In some examples, trigger 38 can remain locked until a dispense authorization is received from the fluid management computer 12. For example, the fluid management computer 12 can generate a work order, and the trigger can remain locked until the user verifies the work order number via user interface 52.

The fluid flows downstream out of valve body 40 through flowmeter 34 and to nozzle 36, which is positioned to apply the fluid at the desired dispense location. The fluid flows through meter 50, which measures a volumetric flow of the fluid. The measured volumetric flow is wirelessly transmitted to the fluid management computer 12 by communication module 48. User interface 52 can also display the volumetric flow to the user, in some examples. The fluid management computer 12 uses the volumetric flow to track and record each discrete fluid dispense event. For example, the fluid management computer 12 knows the type and brand of fluid being dispensed, based on the work order directly entered in the fluid management computer 12 or from the information entered by the user via user interface 52. The fluid management computer 12 can utilize that information, along with the volumetric flow data from handheld fluid meter 28, to generate, update, and maintain various records, such as inventory and supply.

By way of example, a specific discrete dispense event where the customer requests 4.75 l (5 qt.) of Brand A Synthetic Oil, and where the customer wants to visually verify the fluid dispensed is discussed. To initiate the discrete fluid dispense event, the user generates a work order at fluid management computer 12. The relevant information from the work order, such as the type of oil, the brand of oil, and the volume to be dispensed, is wirelessly communicated to handheld fluid meter 28 via a communication link, such as one of communication links 26a-26n (shown in FIG. 1). For example, the technician can key in the relevant work order number utilizing user interface 52, and handheld fluid meter 28 retrieves information associated with that work order from the fluid management computer 12. User interface 52 displays the relevant information to the technician, such as that the current work order is for 4.75 l of Brand A Synthetic Oil. The technician retrieves containers of sealed Brand A Synthetic Oil and show the containers to the customer, thereby providing visual verification to the customer.

With the consumer having visually verified the fluid, the technician dispenses the fluid. In some examples, the technician pours the fluid into fluid reservoir 30. In some examples, the technician directly attaches a pre-filled fluid reservoir 30, such as the manufacturer's container, to valve body 40. With the fluid in fluid reservoir 30, the technician depresses trigger 38, thereby causing valve member 42 to shift from the closed position to the open position. With valve member 42 in the open position, the fluid exits fluid reservoir 30, enters valve body 40 through first end 44, flows through valve member 42, and flows to nozzle 36 through flowmeter 34. Meter 50 tracks the volumetric flow and wirelessly provides information regarding the volumetric flow to the fluid management computer 12 via communication module 48. In some examples, the trigger automatically disengages when the volumetric flow indicated by meter 50 reaches the volume indicated in the work order, thereby stopping the fluid flow through valve 32. The fluid management computer 12 thus tracks and records the actual volume of the particular fluid dispensed during the discrete dispense event.

Handheld fluid meter 28 provides significant advantages. Handheld fluid meter 28 enables tracking and recording of discrete fluid dispense events, which otherwise would occur outside of the fluid management system. Handheld fluid meter 28 also allows the customer to visually verify the precise fluid being provided and integrates such verification into the fluid management system. Tracking and recording discrete dispense events provides more efficient record keeping and inventory tracking. In addition, handheld fluid meter 28 ensures that all fluid dispense events are "inside" of fluid management system 10.

Figure 3A:
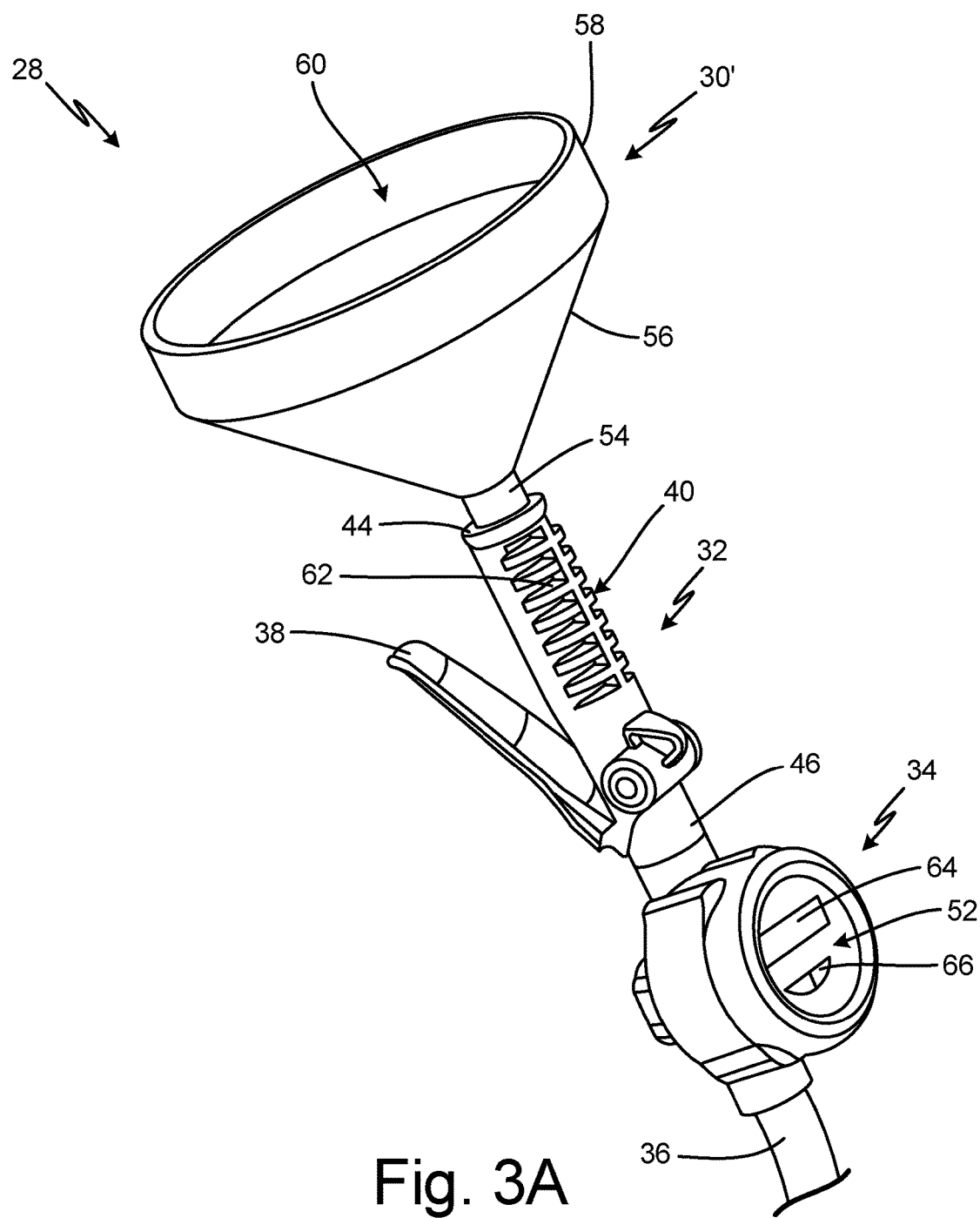
FIG. 3A is a first isometric view of a handheld fluid meter.
Figure 3B:
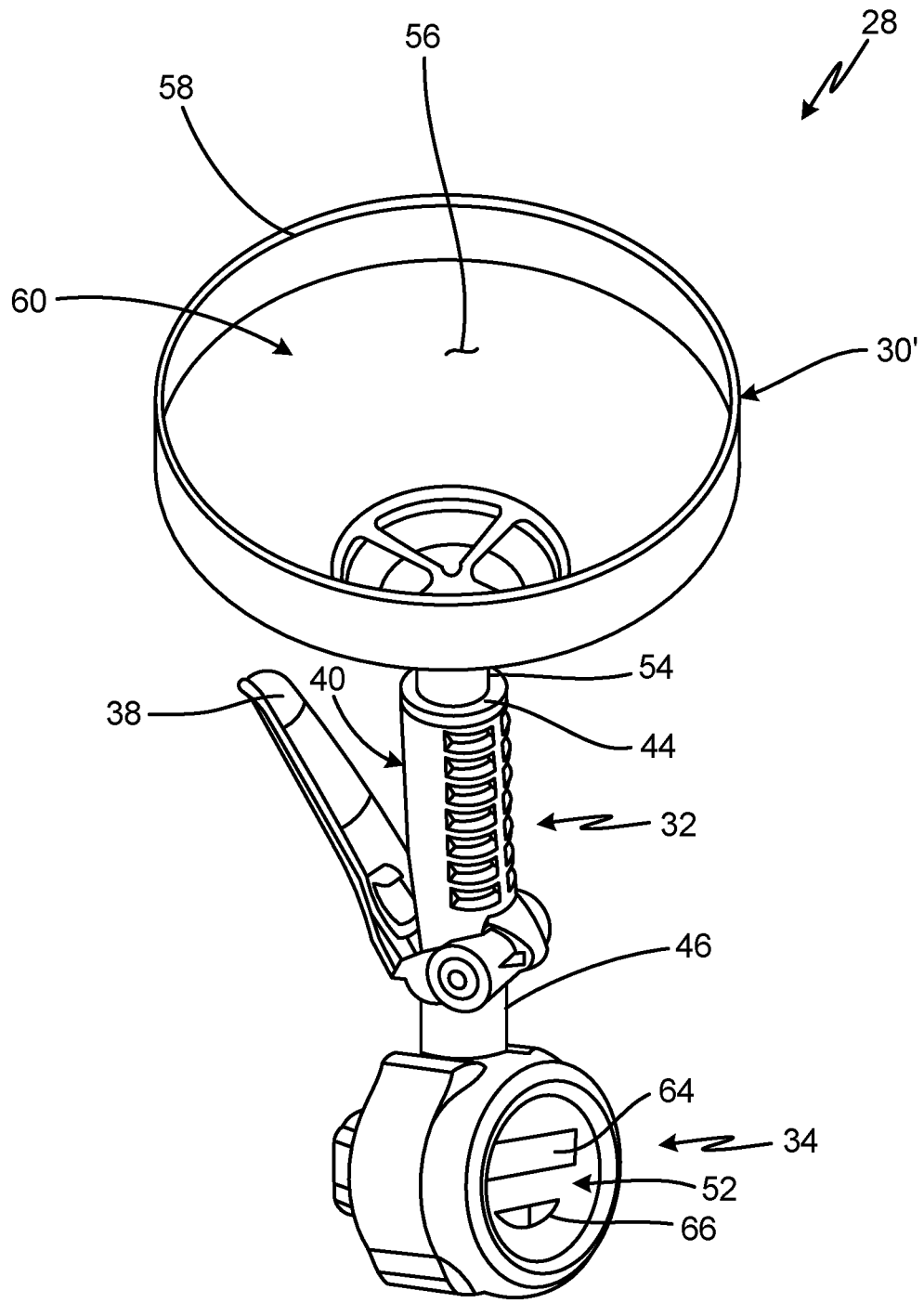
FIG. 3B is a second isometric view of a handheld fluid meter.
Figure 3C:
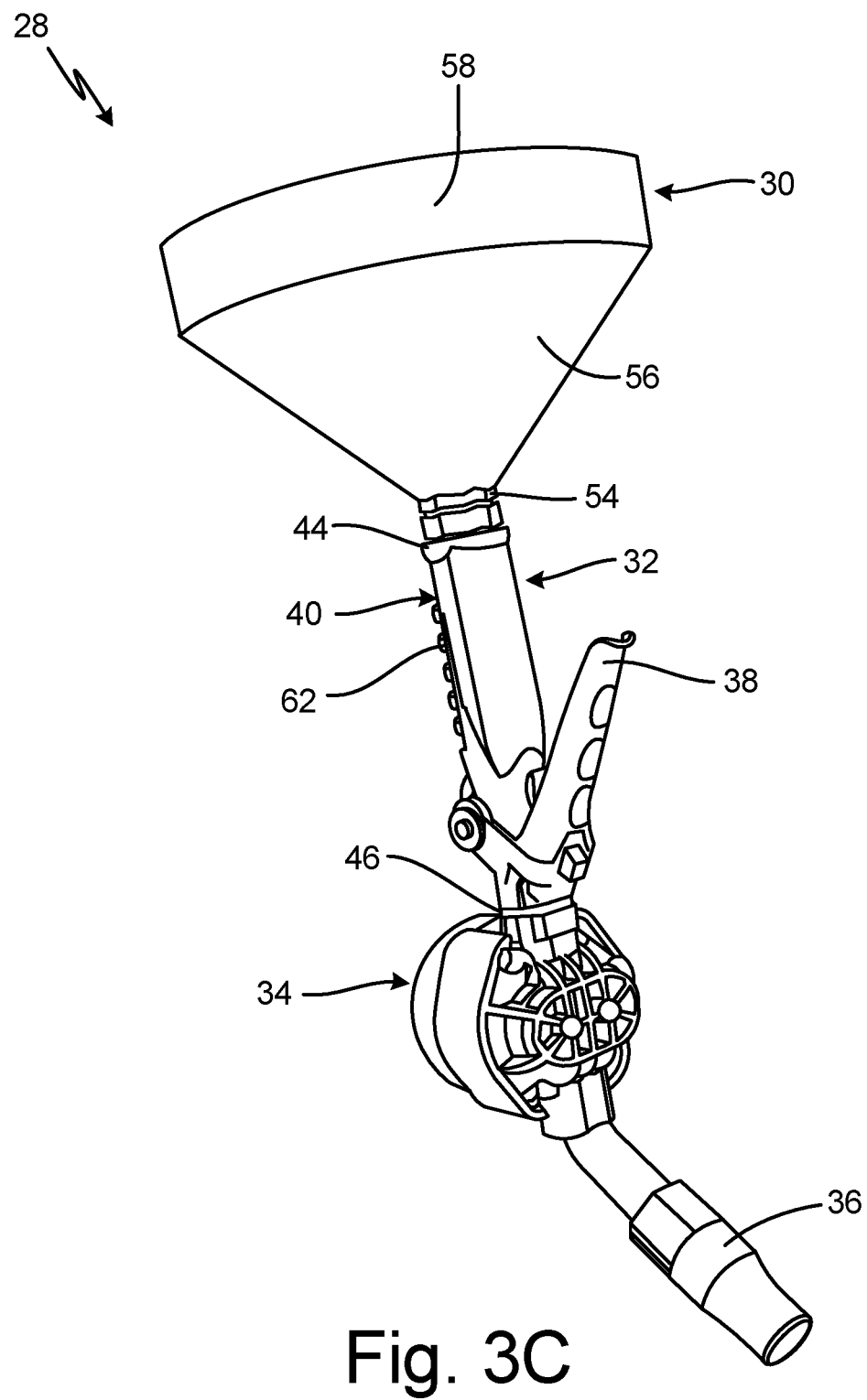
FIG. 3C is a third isometric view of a handheld fluid meter.

FIG. 3A is a first isometric view of handheld fluid meter 28. FIG. 3B is a second isometric view of handheld fluid meter 28. FIG. 3C is a third isometric view of handheld fluid meter 28. FIGS. 3A-3C will be discussed together. Handheld fluid meter 28 includes fluid reservoir 30', valve 32, flowmeter 34, and nozzle 36. Fluid reservoir 30' includes neck 54, cone 56, rim 58, and mouth 60. Trigger 38 and valve body 40 of valve 32 are shown. Valve body 40 includes first end 44, second end 46, and handle 62. User interface 52 of flowmeter 34 is shown, and user interface 52 includes display 64 and controls 66.

Fluid reservoir 30' is attached to valve body 40 of valve 32. Neck 54 of fluid reservoir 30' extends into first end 44 of valve body 40 upstream of valve member 42. Cone 56 extends from neck 54 and is configured to guide fluid poured into fluid reservoir 30' into neck 54. Rim 58 extends vertically from cone 56. Mouth 60 is disposed opposite neck 54 and is configured to receive fluid poured into fluid reservoir 30'.

Valve 32 controls the flow of fluid downstream out of fluid reservoir 30'. Trigger 38 is mounted on valve body 40 and is configured to shift a valve member, such as valve member 42 (FIG. 2), between the open position and the closed position. The outer surface of valve body 40 forms handle 62, and handle 62 allows the user to grasp, manipulate, and operate handheld fluid meter 28 with a single hand. The valve member is movable between an open position, where the fluid can flow out of fluid reservoir 30' through valve 32, and a closed position, where the fluid is prevented from flowing out of fluid reservoir 30'. The valve member is disposed within valve body 40 between first end 44 and second end 46.

Flowmeter 34 is disposed downstream of the valve member and attached to second end 46 of valve body 40. Flowmeter 34 is configured to receive the fluid flowing downstream out of valve 32 and to measure and wirelessly transmit a volumetric flow. As discussed above, flowmeter 34 includes an internal meter, such as a positive displacement meter, configured to measure the volumetric flow, and flowmeter 34 is configured to wirelessly provide the volumetric flow to a fluid management computer, such as fluid management computer 12 (FIG. 1). User interface 52 is disposed on flowmeter 34 and is configured to provide information to and receive information from the user. Display 64 provides information regarding the discrete dispense event, such as the volumetric flow, the work order number, the specific fluid, among others, to the user. Controls 66 receive inputs from the user. Nozzle 36 extends from a downstream end of flowmeter 34 and is configured to guide the fluid exiting flowmeter 34 to a final dispense location. Nozzle 36 can be any suitable nozzle for guiding the fluid, such as a flexible tube or a cone inserted into the downstream end of flowmeter 34.

Handheld fluid meter 28 allows discrete fluid dispense events to be tracked and recorded within a fluid management system, such as fluid management system 10 (FIG. 1). Handheld fluid meter 28 also allows the user to visually verify the specific fluid being dispensed with the consumer, while automatically tracking and recording the dispense event. The user can manipulate handheld fluid meter 28 by grasping handle 62 with a single hand. The user can prepare handheld fluid meter 28 for a discrete dispense event by pouring the fluid into fluid reservoir 30' with the other hand. The user depresses trigger 38, thereby opening a flowpath through valve 32, allowing the fluid to flow downstream out of fluid reservoir 30' and to flowmeter 34. Flowmeter 34 generates the volumetric flow based on the flow through flowmeter 34, and the volumetric flow is communicated to the fluid management computer. The volumetric flow is displayed to the user via display 64. As such, the volume dispensed during the automatic dispense event is automatically tracked.

Handheld fluid meter 28 provides significant advantages. Handheld fluid meter 28 enables tracking and recording of discrete fluid dispense events, which otherwise would occur outside of the fluid management system. A single user can manipulate handheld fluid meter 28 and can simultaneously dispense fluid using handheld fluid meter 28. As such, handheld fluid meter 28 provides increased efficiency and simplifies the tracking and recording of discrete dispense events.

Figure 4:
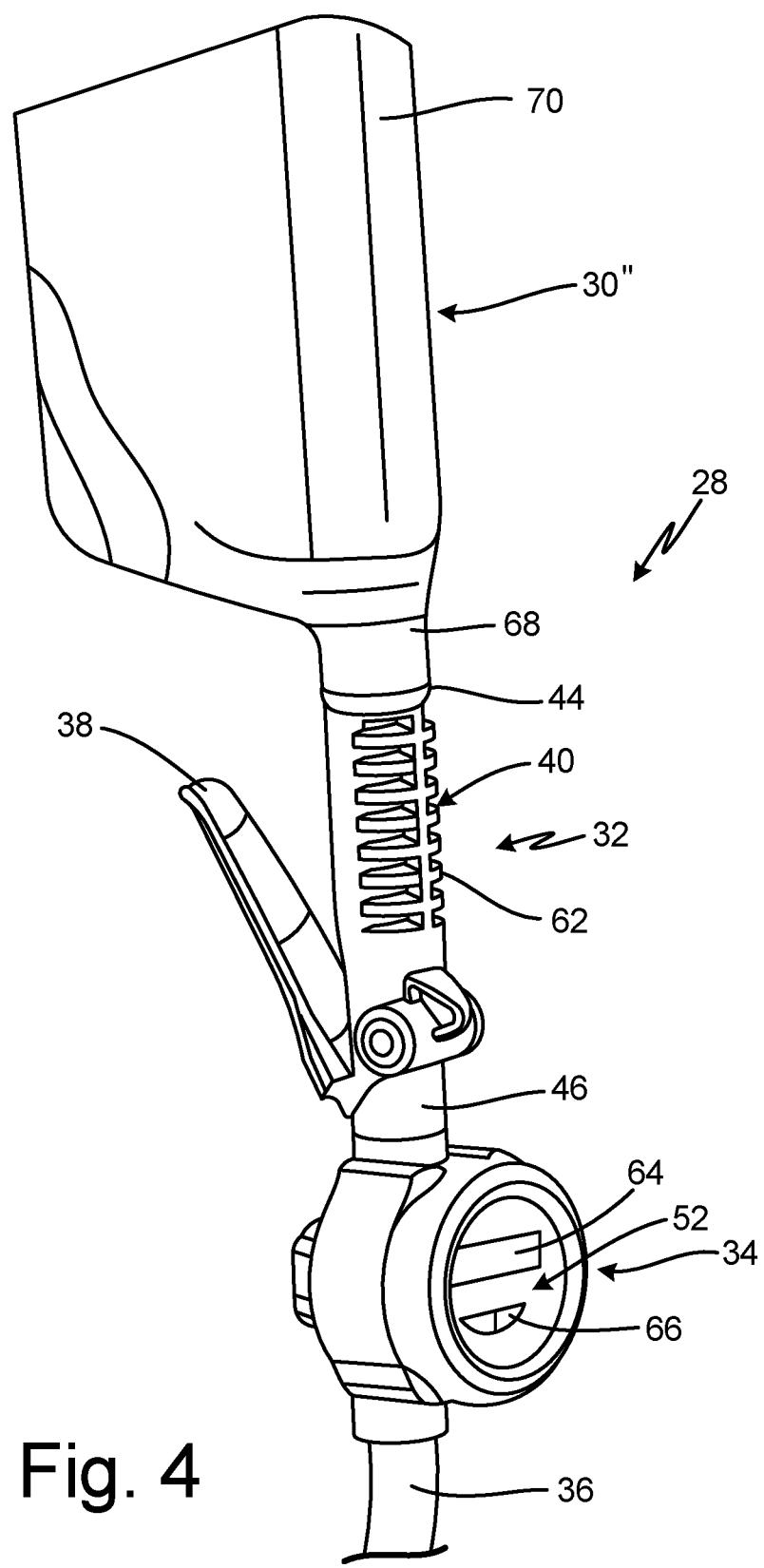
FIG. 4 is an isometric view of a handheld fluid meter

FIG. 4 is an isometric view of handheld fluid meter 28. Handheld fluid meter 28 includes fluid reservoir 30", valve 32, flowmeter 34, and nozzle 36. Fluid reservoir 30" includes neck 68 and body 70. Trigger 38 and valve body 40 of valve 32 are shown. Valve body 40 includes first end 44, second end 46, and handle 62. User interface 52 of flowmeter 34 is shown, and user interface 52 includes display 64 and controls 66.

Fluid reservoir 30" is mounted on valve 32. Neck 68 extends from body 70 and is configured to pour fluid out of body 70 of fluid reservoir 30". Body 70 stores fluid until the fluid is needed for a discrete dispense event. Neck 68 is received by handle 62 upstream of valve member 42 (shown in FIG. 2). Neck 68 can be press-fit onto handle 62 or can include threading configured to mate with threading on handle 62, amongst other options. Fluid reservoir 30" can be a manufacturer's original container that can be swapped on and off of handheld fluid meter 28.

Valve 32 controls the flow of fluid downstream out of fluid reservoir 30". Trigger 38 is mounted on valve body 40 and is configured to shift a valve member, such as valve member 42 (FIG. 2), between the open position and the closed position. The outer surface of valve body 40 forms handle 62, and handle 62 allows the user to grasp, manipulate, and operate handheld fluid meter 28 with a single hand. The valve member is movable between an open position and a closed position, and the valve member is disposed within a portion of valve body 40 between first end 44 and second end 46. The fluid flows through valve body 40 and the valve member between fluid reservoir 30" and flowmeter 34. Flowmeter 34 is disposed downstream of and is attached to second end 46 of valve body 40. User interface 52 provides information to the user via display 64 and receives inputs from the user via controls 66. Flowmeter 34 is configured to receive the fluid flowing downstream out of valve body 40 and to measure and wirelessly transmit a volumetric flow. As discussed above, flowmeter 34 includes an internal meter, such as a positive displacement meter, configured to generate the volumetric flow, and flowmeter 34 is configured to wirelessly provide the volumetric flow data to a fluid management computer, such as fluid management computer 12 (FIG. 1). Nozzle 36 extends from a downstream end of flowmeter 34 and is configured to guide the fluid exiting flowmeter 34 to a final dispense location. Nozzle 36 can be any suitable nozzle for guiding the fluid, such as a flexible tube or a cone inserted into the downstream end of flowmeter 34.

Handheld fluid meter 28 allows discrete fluid dispense events to be tracked and recorded within a fluid management system, such as fluid management system 10 (FIG. 1). Handheld fluid meter 28 also allows the user to visually verify the specific fluid being dispensed with the consumer, while automatically tracking and recording the dispense event. The user can manipulate handheld fluid meter 28 by grasping handle 62 with a single hand. The user can prepare handheld fluid meter 28 for a discrete dispense event by opening fluid reservoir 30", such as by removing a cap, and attaching fluid reservoir 30" directly to first end 44. The user depresses trigger 38, thereby opening a flowpath through valve body 40, allowing the fluid to flow downstream out of fluid reservoir 30" and to flowmeter 34. Flowmeter 34 measures the volumetric flow based on the flow through flowmeter 34, and the volumetric flow is communicated to the fluid management computer. As such, the volume dispensed during the automatic dispense event is automatically tracked.

Figure 5:
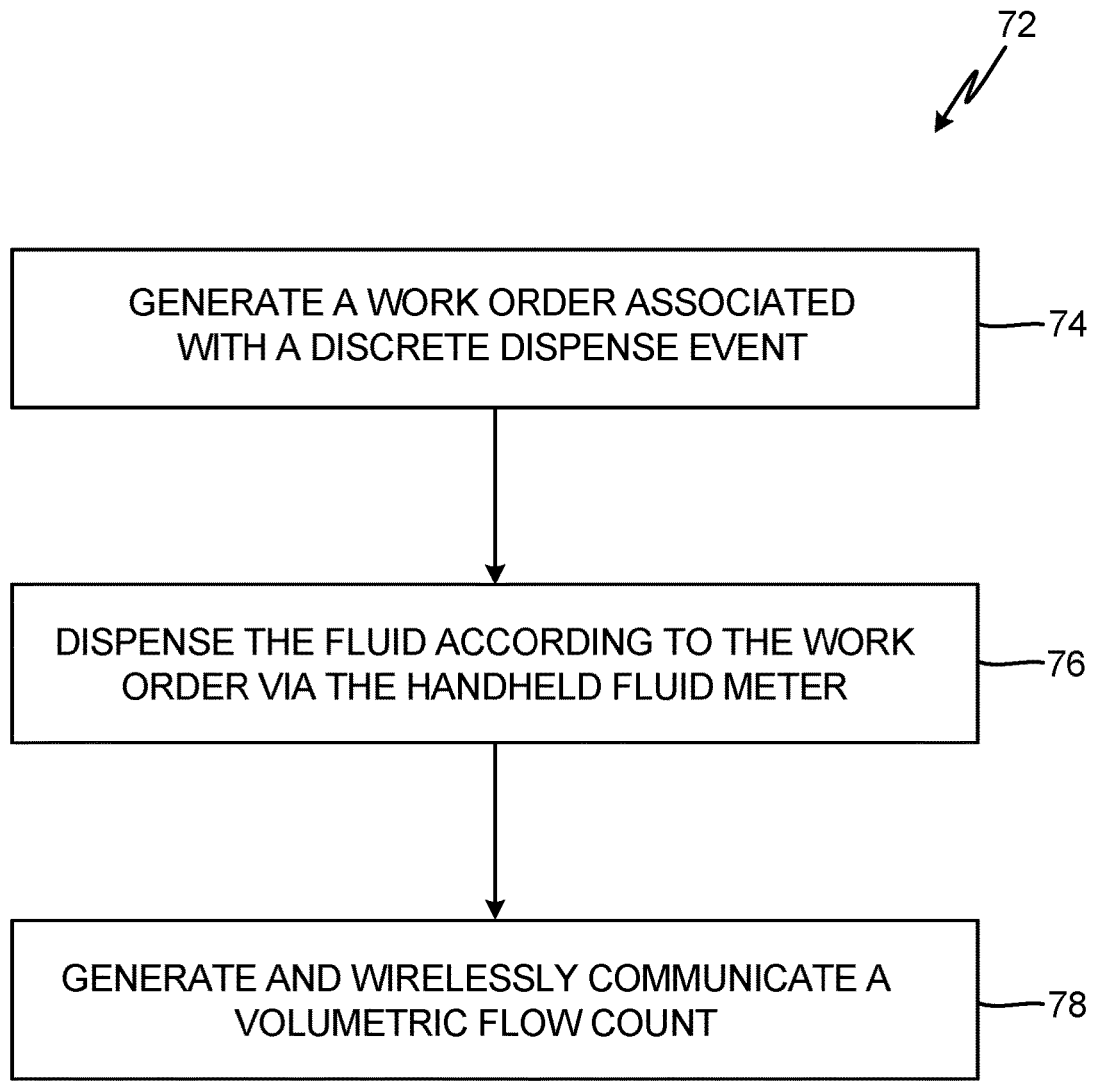
FIG. 5 is a flowchart illustrating a method of tracking discrete fluid dispense events.

FIG. 5 is a flow chart illustrating method 72 of tracking discrete fluid dispense events. In step 74, a work order associated with a discrete dispense event is generated. In some examples, the work order is generated at a fluid management computer, such as fluid management computer 12 (FIG. 1), by a user, such as a technician. A handheld fluid meter, such as handheld fluid meter 28 (FIGS. 2A-2C) is associated with the work order. Associating handheld fluid meter 28 with the work order provides quicker tracking and recording capabilities to the fluid management system. With handheld fluid meter 28 associated with the work order, the information generated by handheld fluid meter 28 during the discrete dispense event is automatically associated with the work order in the fluid management computer 12. In addition, associating handheld fluid meter 28 with the work order can also allow the dispense event to proceed, such as by unlocking a trigger to allow the user to actually dispense the fluid through handheld fluid meter 28. In other examples, the work order is generated directly at handheld fluid meter 28. For example, the user directly generating the work order via a user interface, such as user interface 52 (FIG. 2A).

In step 76, the fluid is dispensed via handheld fluid meter 28 and according to the work order. The user provides the desired fluid to a fluid reservoir, such as fluid reservoir 30 (FIGS. 2A-2C), of handheld fluid meter 28. For example, the user can pour the fluid into a funnel mounted on the handheld fluid meter or can attach an original manufacturer's bottle to the handheld fluid meter, among other options. The user can also visually verify the fluid with the customer prior to providing the fluid to the handheld fluid meter. For example, the user can show the customer the sealed fluid container prior to opening the container. The user can actuate valve 32 from a closed position to an open position to allow the fluid to flow through handheld fluid meter 28. For example, the user can depress a trigger, such as trigger 38 (FIGS. 2A-2C), to cause a valve member, such as valve member 42 (FIG. 2A), to shift to the open position. With valve 32 in the open position, the fluid can flow downstream through handheld fluid meter 28.

In step 78, a volumetric flow of the fluid flowing through handheld fluid 28 meter is measured and communicated to the fluid management computer 12. The volumetric flow is wirelessly communicated to the fluid management computer 12. A flowmeter, such as flowmeter 34 (FIGS. 2A-2C), is attached to the downstream end of valve 32 and receives the fluid flowing out of valve 32. Flowmeter 34 can include a positive displacement meter, such as meter 50 (FIG. 2A), that measures a volumetric flow. Handheld fluid meter 28 further includes a transmitter, such as communication module 48 (shown in FIG. 2A), to communicate the volumetric flow to the fluid management computer 12. The transmitter is wireless and can be configured to send signals, receive signals, or both. For example, the handheld fluid meter can be in a transmit-only mode, where the user inputs a unique identifier, such as a work order number, via the user interface. The volumetric flow data can be automatically tagged with the identifier and sent to the fluid management computer 12 during and/or after the dispense event. The fluid management computer 12 uses the identifier to associate the dispense event with a particular customer while also tracking the actual volume and fluid dispensed. In another example, handheld fluid meter 28 can be in a transmit/receive mode where the identifier, along with other relevant information, is received from and/or sent to the fluid management computer 12, and the volumetric flow data is associated with the received identifier.

As discussed above, flowmeter 34 can include a positive displacement meter, and handheld fluid meter 28 can be gravity-fed. As the fluid flows through the positive displacement meter, air can pass through the meter along with the fluid, which can affect the accuracy of the volumetric flow. To ensure accurate recording and tracking, the fluid management computer 12 and/or handheld fluid meter 28 can include software configured to reduce the effect of any error from the positive displacement meter. Fluids are typically dispensed according to known volumes. For example, engine oil is typically dispensed per liter or per quart. The software can associate the actual volumetric flow data with the type of fluid dispensed, and provide an output indicating the estimated number of units consumed.

An example estimation routine will be discussed. A work order can specify that 5 qts of Brand A engine oil should be dispensed. The user dispenses the oil using the handheld flow meter, and the positive displacement meter generates a volumetric count. The positive displacement meter can be a meter where 30 rotations indicates a quart of fluid has passed through the meter, for example. Due to some air passing through with the fluid, the positive displacement meter may register 162 rotations over the entire work order, which would indicate that 5.4 quarts were actually dispensed. The ratio of rotations to volume is already known, however, so the software can compare the actual volumetric data with the expected volumetric data. Where the error is sufficiently small, the software can account for any error by automatically recording the expected volume as the actual volume for tracking and record keeping.

Method 72 provides significant advantages. Method 72 allows for discrete dispense events to be automatically measured and recorded within fluid management system 10. Fluid management computer 12 receives the volumetric data from the handheld fluid meter and can automatically track and record the relevant data. For example, the volumetric data can be associated with a work order and a customer and can be tracked for inventory and record keeping. Improved accuracy for tracking and recording decreases losses and increases shop efficiency. For example, resupply orders can be automatically placed by fluid management system when the tracked inventory reaches a preset resupply level. In addition, handheld fluid meter 28 wirelessly communicates within fluid management system 10. Wirelessly communicating with handheld fluid meter 28 provides increased efficiency, as discrete fluid dispenses can be tracked and recorded from any location within the facility. Moreover, wirelessly sharing data from handheld fluid meter 28 increases efficiency because the technician can automatically download the work order and all associated information directly to handheld fluid meter 28 from fluid management computer 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A handheld fluid meter comprising:
   a fluid reservoir;
   a valve including a rigid body extending between a first end and a second end, the body including a passage between the first end and the second end, wherein the first end is directly attached to and supports the fluid reservoir, wherein the body includes a handle portion configured to be manipulated by a hand of a user, and wherein the valve is disposed downstream of the fluid reservoir and configured to control a flow of fluid out of the fluid reservoir through the passage; and
   a flowmeter directly attached to the second end of the body of the valve and disposed within the flow of fluid out of the valve, such that the valve is disposed between the fluid reservoir and the flowmeter, the flowmeter configured to measure a volumetric flow of the fluid through the meter and configured to wirelessly communicate the volumetric flow.

2. The handheld fluid meter of claim 1, wherein the fluid reservoir is removably attached to the valve.

3. The handheld fluid meter of claim 2, wherein the fluid reservoir comprises a funnel.

4. The handheld fluid meter of claim 2, wherein the fluid reservoir comprises a container prefilled with a known volume of fluid.

5. The handheld fluid meter of claim 1, wherein the valve comprises:
   a valve mechanism; and
   a valve trigger configured to be manually displaced to mechanically open the valve.

6. The handheld fluid meter of claim 1, wherein the flowmeter comprises:
   a volumetric meter configured to receive the fluid flow and to measure a volumetric flow; and
   a communication module configured to wirelessly communicate the volumetric flow.

7. The handheld fluid meter of claim 6, wherein the communication module comprises a transceiver configured to both send and receive signals.

8. The handheld fluid meter of claim 6, wherein the volumetric meter is a positive displacement meter.

9. The handheld fluid meter of claim 6, wherein the flow meter further comprises a user interface.

10. The handheld fluid meter of claim 1, further comprising:
    a nozzle extending from the flowmeter, the nozzle configured to route the fluid exiting the flowmeter.

11. A fluid management system comprising:
    a fluid management computer comprising:
      a processor; and
      a memory encoded with instructions that, when executed by the processor, causes the processor to track and record a characteristic of a fluid being dispensed by one of a plurality of fluid dispensing components;
    wherein at least one of the plurality of fluid dispensing components is a handheld fluid meter, the handheld fluid meter comprising:
      a fluid reservoir;
      a valve including a rigid body extending between a first end and a second end, the body including a passage between the first end and the second end, wherein the first end is directly attached to and supports the fluid reservoir, wherein the body includes a handle portion configured to be manipulated by a hand of a user, and wherein the valve is disposed downstream of the fluid reservoir and configured to control a flow of fluid out of the fluid reservoir through the passage; and a flowmeter directly attached to the second end of the body of the valve and disposed within the flow of fluid out of the valve, the flowmeter configured to measure a volumetric flow of the fluid through the flowmeter and configured to wirelessly communicate the volumetric flow to the fluid management computer.

12. The fluid management system of claim 11, further comprising:

a transceiver configured to communicate with the fluid management computer via a wired connection and further configured to communicate with the handheld fluid meter via a wireless connection.

13. The fluid management system of claim 11, wherein the handheld fluid meter further comprises:

a communication module configured to send signals to the fluid management computer and to receive signals from the fluid management computer.

14. The fluid management system of claim 11, wherein the handheld fluid meter further comprises a user interface.

15. The fluid management system of claim 11, wherein the valve comprises:

a valve mechanism; and a valve trigger configured to be manually displaced to mechanically open the valve.

16. The fluid management system of claim 11, wherein the flowmeter comprises:

a volumetric flow meter configured to receive the fluid flow and to measure a volumetric flow; and a communication module configured to receive the volumetric flow from the volumetric flow meter and to wirelessly communicate the volumetric flow.

17. The fluid management system of claim 11, wherein the handheld fluid meter is gravity fed.

18. A method of tracking discrete fluid dispense events, the method comprising:

generating a work order associated with a discrete fluid dispense event;

dispensing the fluid according to the work order through a handheld fluid meter and from a container mounted on and supported by the handheld fluid meter, the handheld fluid meter including:

a valve including a rigid body extending between a first end and a second end and having a passage through the body between the first end and the second end, wherein the first end is directly attached to and supports the container, wherein the body includes a handle portion configured to be manipulated by a hand of a user, and wherein the valve is disposed downstream of the container and configured to control a flow of fluid out of the container and through the passage; and a flowmeter directly attached to the second end of the body of the valve such that the body of the valve is between the container and the flowmeter, and the flowmeter is disposed within the flow of fluid out of the passage; and generating a volumetric flow count of the fluid with the flowmeter and wirelessly communicating the volumetric flow count to a fluid management computer with the flowmeter.

19. A handheld fluid meter comprising:

a fluid reservoir comprising:

a neck; and a cone-shaped body extending between the neck and a mouth, the cone-shaped body configured to route a fluid received through the mouth to the neck;

a valve attached to the fluid reservoir, the valve comprising:

a body extending between a first end, a second end, and a passage through the body between the first end and the second end, the first end connected to the neck of the fluid reservoir, the body further including a handle portion configured to be manipulated by a hand of a user, wherein the body supports the fluid reservoir;

a valve member disposed within the body downstream of the first end, the valve member movable between an open position where fluid can flow through the passage and a closed position where the fluid is prevented from flowing through the passage; and a trigger mounted on the body and connected to the valve member, the trigger configured to actuate the valve member between the open position and the closed position; and a flowmeter attached to the second end of the body downstream of the valve member, the flowmeter configured to measure a volumetric flow of the fluid through the meter and configured to wirelessly communicate the volumetric flow.

20. The handheld fluid meter of claim 5, wherein the trigger is mounted on the handle and the trigger is configured to pivot on the handle to mechanically open the valve.

* * * * *